(12) United States Patent
Schramm et al.

(10) Patent No.: US 11,732,824 B2
(45) Date of Patent: Aug. 22, 2023

(54) NUT FOR JOINING CONDUITS

(71) Applicant: Caterpillar Inc., Peoria, IL (US)

(72) Inventors: Zachary Alan Schramm, Glendale, AZ (US); Bradley James Briars, Palatine, IL (US); Robert E. Riedel, Jr., Fox River Grove, IL (US)

(73) Assignee: Caterpillar Inc., Peoria, IL (US)

( * ) Notice: Subject to any disclaimer, the term of this patent is extended or adjusted under 35 U.S.C. 154(b) by 642 days.

(21) Appl. No.: 16/774,772

(22) Filed: Jan. 28, 2020

(65) Prior Publication Data

US 2021/0231241 A1 Jul. 29, 2021

(51) Int. Cl.
*F16L 19/02* (2006.01)
*F16B 37/16* (2006.01)
*F16B 37/00* (2006.01)

(52) U.S. Cl.
CPC .............. *F16L 19/02* (2013.01); *F16B 37/00* (2013.01); *F16B 37/16* (2013.01)

(58) Field of Classification Search
CPC ......... F16L 19/02; F16L 19/025; F16B 37/16; F16B 37/00
See application file for complete search history.

(56) References Cited

U.S. PATENT DOCUMENTS

| 5,423,645 A | * | 6/1995 | Muller | F16B 37/065 |
| | | | | 411/113 |
| 10,941,805 B2 | * | 3/2021 | Schramm | F16L 33/24 |
| 2009/0265891 A1 | * | 10/2009 | Pett | G05G 1/10 |
| | | | | 16/430 |
| 2016/0377207 A1 | * | 12/2016 | Witkowski | F16L 19/025 |
| | | | | 285/386 |

FOREIGN PATENT DOCUMENTS

WO WO2016205208 A1 12/2016

* cited by examiner

*Primary Examiner* — James M Hewitt, II

(57) ABSTRACT

A nut for joining conduits includes a body having a generally cylindrical shape and defining a central opening. A plurality of lugs can extend outwardly from an outer surface of the body and provide one or more strike surfaces. The central opening can include a threaded portion proximate a first end of the nut and a tapered portion extending from the threaded portion. The tapered portion defines a frustoconical surface that expands the central opening beyond the threaded portion. The tapered portion may terminate at an undercut or flange proximate the second end of the nut.

20 Claims, 4 Drawing Sheets

NUT FOR JOINING CONDUITS

TECHNICAL FIELD

This patent disclosure relates generally to pumping conduits and, more particularly, to nuts used to connect conduit sections for pumping operations.

BACKGROUND

Pumping operations in industries like hydraulic fracking (or "fracking"), concrete pouring, well service, and others, can include pumping high viscosity fluids and/or fluids at high pressures. Such fluids may be transported via conduits, which can be subjected to high, cyclically applied stresses. The conduits are typically made from pipe sections that are connected to one another using threaded nuts. These nuts typically include projecting wings or lugs that provide the ability to apply torque to tighten or loosen the nuts. For instance, a lug can provide a surface on which a sledge hammer or a hydraulic hammer can strike to provide the significant impact loading or torque required to tighten or remove the nuts.

Traditionally, nuts for such pumping operations are known to have a limited service life due to the extreme conditions of their use and installation. Often, the lugs on nuts become deformed from repeated striking during nut installation. Additionally, the nuts are prone to cracks when the pipe segments they are used to connect are subject to bending loads, and to fatigue failures when subjected to cyclical pressure loading from the incompressible fluid being pumped at high pressure within the pipe segments.

One example of a known wing nut can be seen in WO 2016/205208 ("Witkowski"), which describes a wing nut having a "full root radius" and an "increased wall thickness." While the wing nut of Witkowski may represent an improvement over known wing nuts, it is still ineffective in improving all aspects of use and operation of nuts.

SUMMARY

In an aspect of the present disclosure, a nut can include a body having a generally cylindrical shape extending along an axis from a first end to a second end. The body can include a sidewall defining an outer surface of the body and a central opening around the axis. The central opening can include a first surface extending a first distance from the first end of the body; at least one thread formed on the first surface; a second surface adjacent the first surface and extending away from the first surface and toward the second end, the second surface being angled relative to the first surface; and a third surface proximate the second end, the third surface being disposed radially inwardly of the first surface and the second surface. The nut can also include a plurality of lugs extending radially outwardly from the outer surface of the body.

In another aspect of this disclosure, a nut may include a body having a generally cylindrical shape and extending along an axis between a first end and a second end. The body may define a central opening including a threaded surface proximate the first end and a tapered surface extending between the threaded surface and the second end. A first radius at a first axial position of the tapered surface relatively closer to the first end is smaller than a second radius at a second axial position of the tapered surface relatively closer to the second end. The nut can also include at least one thread formed on the first surface; and a plurality of lugs extending radially outwardly from the outer surface of the body.

In yet another aspect of this disclosure, a nut includes a body having a generally cylindrical shape along an axis between a first end and a second end. The body defines a central opening including a substantially cylindrical threaded portion proximate the first end, a frustoconical portion extending from the threaded portion toward the second end, and a third substantially cylindrical surface proximate the second end. A radius of the frustoconical portion is relatively smaller proximate the threaded portion and relatively larger away from the threaded portion. The third substantially cylindrical portion has a radius less than a radius of the threaded portion. The nut also includes at least one thread formed on the first surface; and a plurality of lugs extending outwardly from the outer surface of the body.

DETAILED DESCRIPTION

This disclosure relates to conduits for pumping systems, and, more particularly, to nuts for connecting segments of pipe or conduits such as those used in fracking, concrete pumping, well servicing, oil and gas, construction, and other industries. In embodiments described herein, a nut may be used on a hammer union for connecting two pipe segments that are used to transfer fluids under pressure during oilfield service or production operations. Such nuts may be referred to as "hammer nuts." However, the disclosure is not limited to such nuts. Instead, this disclosure generally describes a generic "nut," which in some settings, may correspond to a "hammer nut," a "wing nut," a "lug nut," or other known nuts. Wherever possible, the same reference numbers will be used through the drawings to refer to the same features.

Figure 1:
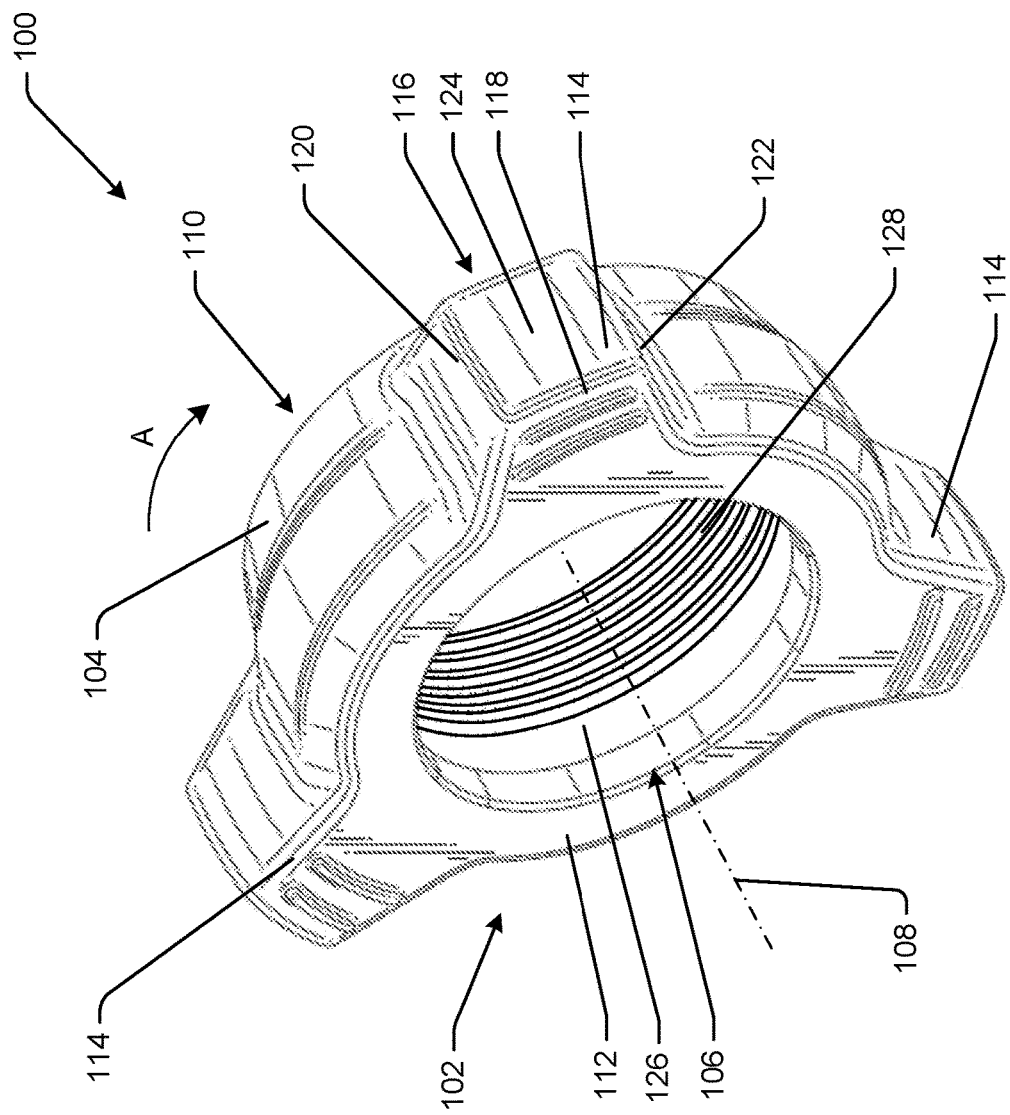
FIG. 1 is a perspective view of a nut in accordance with aspects of this disclosure.

FIG. 1 is a perspective view of an example nut 100. The nut 100 includes a body 102 having a generally hollow cylindrical shape that includes a sidewall 104 and a central opening 106. The sidewall 104 extends generally in an axial direction, e.g., along a central axis 108, having a length from a first face or end 110 to a second face or end 112. As illustrated, the first end 110 and the second end 112 may be surfaces that are substantially parallel, and the axis 108 may be substantially normal to both the first end 110 and the second end 112. The sidewall 104 may have a wall thickness, e.g., generally along a radius extending from the axis 108. As described further herein, the wall thickness may vary along the length of the nut 100, e.g., between the first end 110 and the second end 112.

The nut 100 is also illustrated as including three wings or lugs 114 spaced radially around, and protruding from, the sidewall 104. Each of the lugs 114 generally has a lug height extending between a first lug face 116 and a second lug face 118, e.g., generally along the axis 108. In the illustrated example, the second lug face 118 may be substantially coplanar with and/or form an extension of, the second end 112. In contrast, the first lug face 116 may be axially-spaced from the first end 110, e.g., so the lugs 114 are shorter along the axial direction than the body 102 of the nut 100. Each of the lugs 114 also generally includes a first strike face or surface 120 and a second strike face or surface 122 offset from the first strike surface 120, e.g., generally along a circumference of the nut 100. An outer lug surface 124 extends between distal ends of the first strike surface 120 and the second strike surface 122. The outer lug surface 124 may be contoured, e.g., arcuate, and in some instances, may generally have a constant radius about the axis 108. In examples, the curved shape of the outer lug surface 124 may strengthen the transitional areas between the strike surfaces 120, 122 and the outer lug surface 124, e.g., by increasing angles between adjacent surface and/or by increasing material thickness at these transitional areas, as compared to a conventional lug design having a flat or tangentially-extending outer surface relative to the central opening 106.

As also generally illustrated in FIG. 1, and as detailed further herein, the central opening 106 is generally defined by an interior surface 126 and one or more threads 128 are formed on a portion of the interior surface 126 proximate the first end 110. Additional aspects of the central opening 106 are detailed further below, in connection with a description of FIG. 4.

In use, the nut 100 may be secured to a threaded end of a pipe or conduit (not shown). More specifically, the nut 100 may be threaded onto the pipe by rotating the nut 100 in a direction A shown in FIG. 1. As noted above, a pipeline including the nut 100 may be subjected to large pressures and the nut 100 may be secured only upon applying a significant rotational force. The lugs 114 provide surfaces upon which this force can be applied. Specifically, during installation, a technician may strike or otherwise engage the first strike surface 120 on one of the lugs 114 to apply a force that produces a torque to securely tighten the nut 100. The lugs 114 also provide a surface for application of a force in an opposite direction, e.g., to remove the nut 100. More specifically, a technician may strike or otherwise engage the second strike surface 122 on one of the lugs 114 to apply a force that produces a torque in a direction opposite that of the arrow A to loosen the nut 100.

In some examples, the nut 100 may be a forged part and can be made from steel, iron, alloys, or the like. In some examples, forging the nut 100 as a single part, e.g., including the body 102 and the lugs 114, may enhance overall strength of the nut 100, e.g., to withstand large forces on the first strike surface 120 and the second strike surface 122. The central opening 106 may be formed as part of the forging process or may be formed during a post-process. Similarly, contours and features of the inner surface 126, including the threads 128, may be formed during the forging process or via one or more subsequent processes.

The nut 100 illustrated in FIG. 1 is for example only; modifications are contemplated. For example, although three lugs 114 are illustrated in FIG. 1, the nut 100 may include more or fewer lugs 114 in different implementations. Moreover, although the lugs 114 are illustrated as being equally spaced about the axis 108, in other implementations the lugs 114 may be otherwise spaced. The lugs 114 also are not limited to the size and shape shown. Without limitation, the lug height may be larger or smaller, the relative angle of the first lug face 116 to the second lug face 118 may be altered, the distance between the first strike surface 120 and the second strike surface 122 may vary, and/or the angle of the first strike surface 120 to the second strike surface 122 can increase or decrease relative to the illustration. Also in some instances, one of the lugs 114 may be differently sized and/or shaped than another of the lugs 114. Stated differently, although the lugs 114 are illustrated as being identical, they need not be identical.

Figure 2:
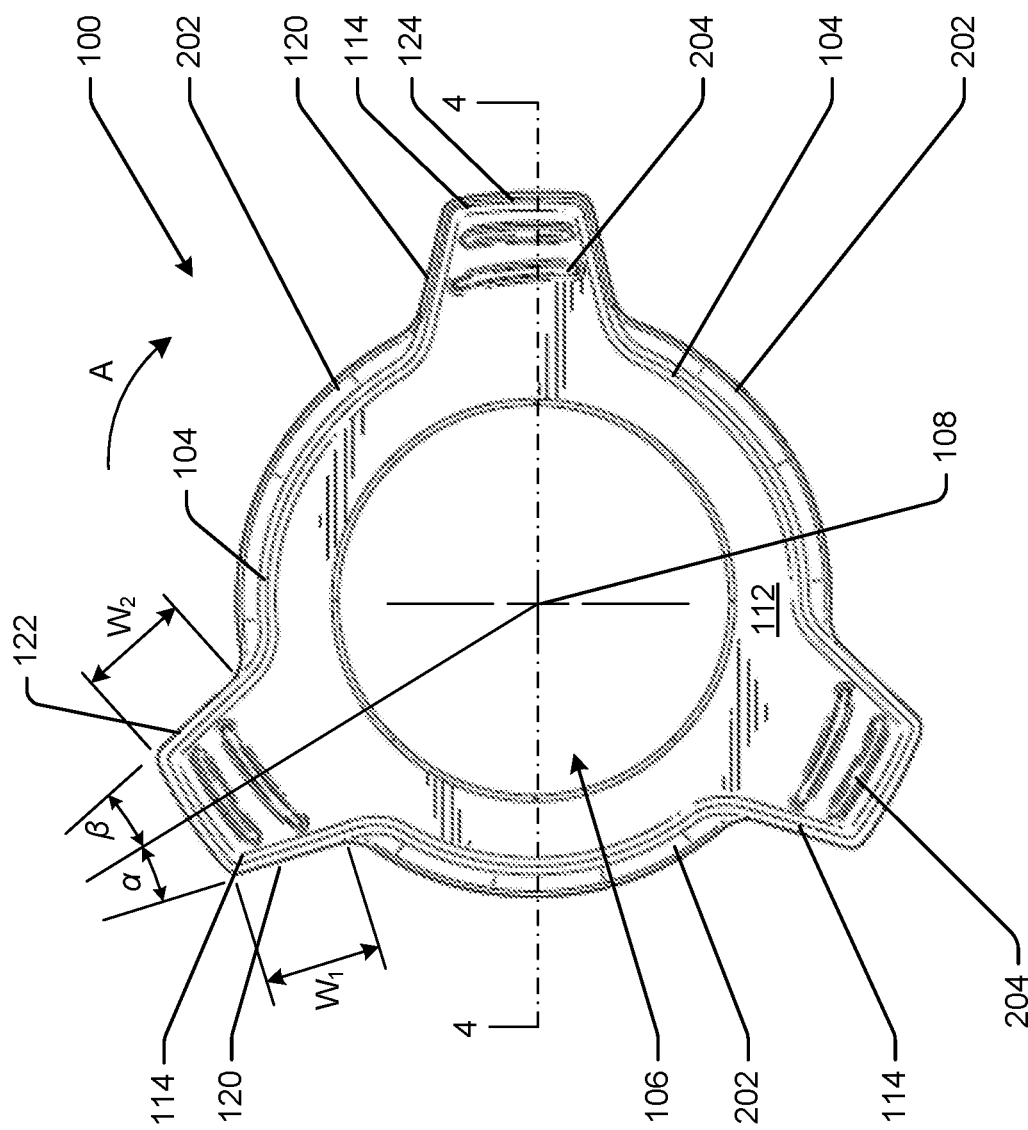
FIG. 2 is a plan view of the nut of FIG. 1, in accordance with aspects of this disclosure.
Figure 3:
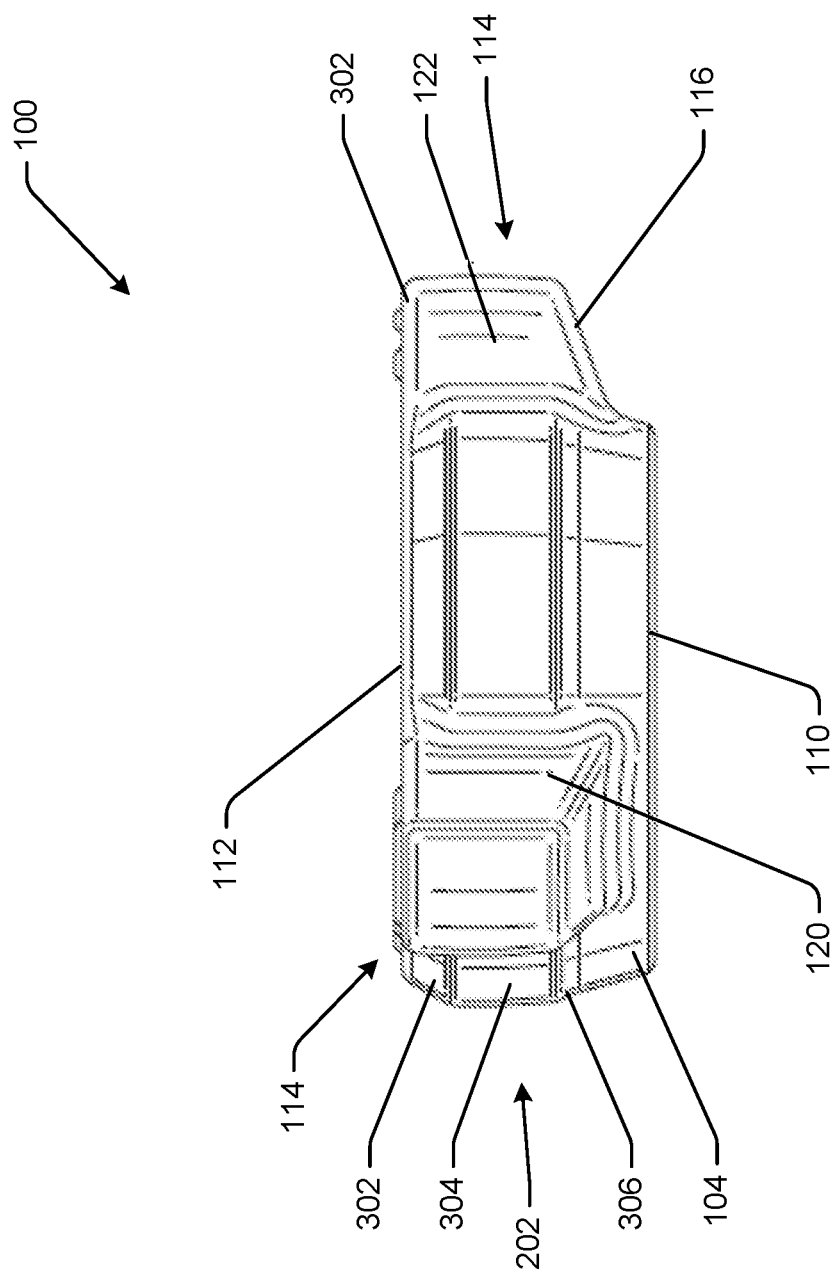
FIG. 3 is a side view of the nut of FIG. 1, in accordance with aspects of this disclosure.

FIG. 2 is a plan view of the nut 100, viewing the first end 112 generally along the axis 108. FIG. 2 shows the arrangement of the lugs in more detail. Specifically, FIG. 2 illustrates that that the first strike face 120 and the second strike face 122 generally cause each of the lugs 114 to have a generally trapezoidal shape. As also illustrated, the first strike face 120 may be disposed at a first angle α relative to a radius of the nut 100 passing through a center of the lug end face 124 and the second strike surface 122 may be disposed at a second angle β relative to the same radius. In the illustration, the first angle α is relatively larger than the second angle β. Because of this difference in angles, a surface area of the first strike surface 120 will differ from a surface area of the second strike surface 122. Stated differently, a first width $W_1$ of the first strike surface 120, e.g., measured as a distance along the first strike surface 120 between the sidewall 104 and the lug end face 124, is greater than a second width $W_2$ of the second strike surface 122, e.g., measured as a distance along the second strike surface 122 between the sidewall 104 and the lug end face 124. As a result, the first strike face 120 may present a larger strike target to facilitate tightening during installation of the wing nut 100. In examples, the first angle α is relatively larger than the second angle β. Without limitation, the first angle α may be from about 12-degrees to about 15-degrees and the second angle β may be from about 10-degrees to about 12-degrees. These are for example only, as, depending on the application, the angles α, β and widths $W_1$, $W_2$ may vary. In some examples, it may be desirable that the angles α, β are substantially the same. In still further examples, the second angle β may be larger than the first angle α, which may result in the second strike surface 122 having a greater surface area than the first striking surface 120, e.g., because the second width $W_2$ may be greater than the first width $W_1$. Moreover, and as illustrated in FIG. 3, the widths $W_1$, $W_2$ may vary along the axial direction.

In addition to presenting a larger target for striking the nut 100 in a tightening direction (e.g., to rotation in the direction of arrow A), the angles α, β may also function to internally redirect the direction of application of the tightening impact force. For instance, angling the first striking surface 120 as illustrated may result in a more tangential direction of a force applied on that surface, e.g., relative to the opening 106. Altering the impact of this force may reduce internal stresses acting transversely within the sidewall 104.

As also illustrated in FIG. 2, the nut 100 may also include a plurality of ribs 202 disposed generally peripherally around the sidewall 104. For instance, the ribs 202 may further increase the strength and resilience of the nut 100. As illustrated, the ribs 202 generally extend circumferentially between the lugs 114, e.g., such that a first end of one of the ribs 202 contacts or terminates at the first striking surface 120 on one of the lugs 114 and a second, opposite end of the one of the ribs 202 contacts or terminates at the second striking surface 122 of an adjacent one of the lugs 114. Although the ribs 202 are illustrated as extending completely between adjacent lugs 114, in other examples the ribs 202 may terminate at locations spaced from the lugs 114. For instance, by terminating the ribs 202 at a position spaced from the lugs 114, the surface area of the strike surfaces 120, 122 may be further increased. Larger strike surfaces 120, 122 may be easier to strike, thus improving accuracy of the strike onto those surfaces. This improved accuracy may provide greater efficiency in securing and remove the nut 100, and may reduce damage caused by inaccurate strikes.

As can also be seen from FIG. 1 (and in FIG. 3, discussed in more detail, below) the ribs 202 may have a contoured outer surface, such that the ribs 202 have a different thickness, e.g., as measured radially outwardly from the sidewall 104. For instance, the ribs 202 may result in a relatively larger thickness spaced from the first end 110 and the second end 112 and a relatively smaller thickness proximate those faces. A maximum thickness of each of the ribs 202 may be relatively closer to the second end 112 although this is for example only. In at least some instances, the maximum thickness may be axially located to overlap or correspond to a termination of the one or more threads 128.

FIG. 2 also illustrates that each of the lugs 114 can include two raised ridges 204. The ridges 204 may provide visual contrast, and/or may provide tactile features on the nut, e.g., to promote alignment and/or installation. Of course, the shape, orientation and number of ridges 204 may be different than what is illustrated in FIG. 2.

FIG. 3 is a side view of the nut 100, and illustrates many of the features described above in more detail. For instance, FIG. 3 better illustrates the contour of the ribs 202. As shown, each of the ribs includes a first tapered portion 302, proximate the second end 112, an intermediate portion 304, and a second tapered portion 306. The first tapered portion 302 and the second tapered portion 306 may have the same or different angles, e.g., relative to the axis 108. In examples, the intermediate portion 304 may be substantially cylindrical, e.g., parallel to the axis 108 in cross-section, although in implementations the intermediate portion 304 may be other than vertical when shown in profile, as in FIG. 3. By way of non-limiting example, the intermediate portion 304 may be arcuate, angled, or otherwise formed. As noted above, the ribs 202 may provide an increased thickness at areas of the nut 100. As also illustrated in FIG. 3, the sidewall 104 may be other than cylindrical.

FIG. 3 also shows the lugs 114 in more detail. As illustrated, the first lug surface 116 may be angled relative to the first end 110 and the second end 112. Moreover, the first lug surface 116 may terminate at a position spaced from the first end 110. Accordingly, the first strike surface 120 and the second strike surface 122 are substantially trapezoidal (with the exception of the contour created by the abutting rib 202). Of course, and as noted herein, the illustrated shapes, sizes, and contours are for example only. For instance, and without limitation, the first lug surface 116 may be substantially parallel to the second lug surface 118 (and/or the first end 110 and/or the second end 112). As will be appreciated, altering the angles of the first lug surface 116 and/or of the second lug surface 118 may result in a varied surface area of the first strike surface 120 and/or the second strike surface 122.

Figure 4:
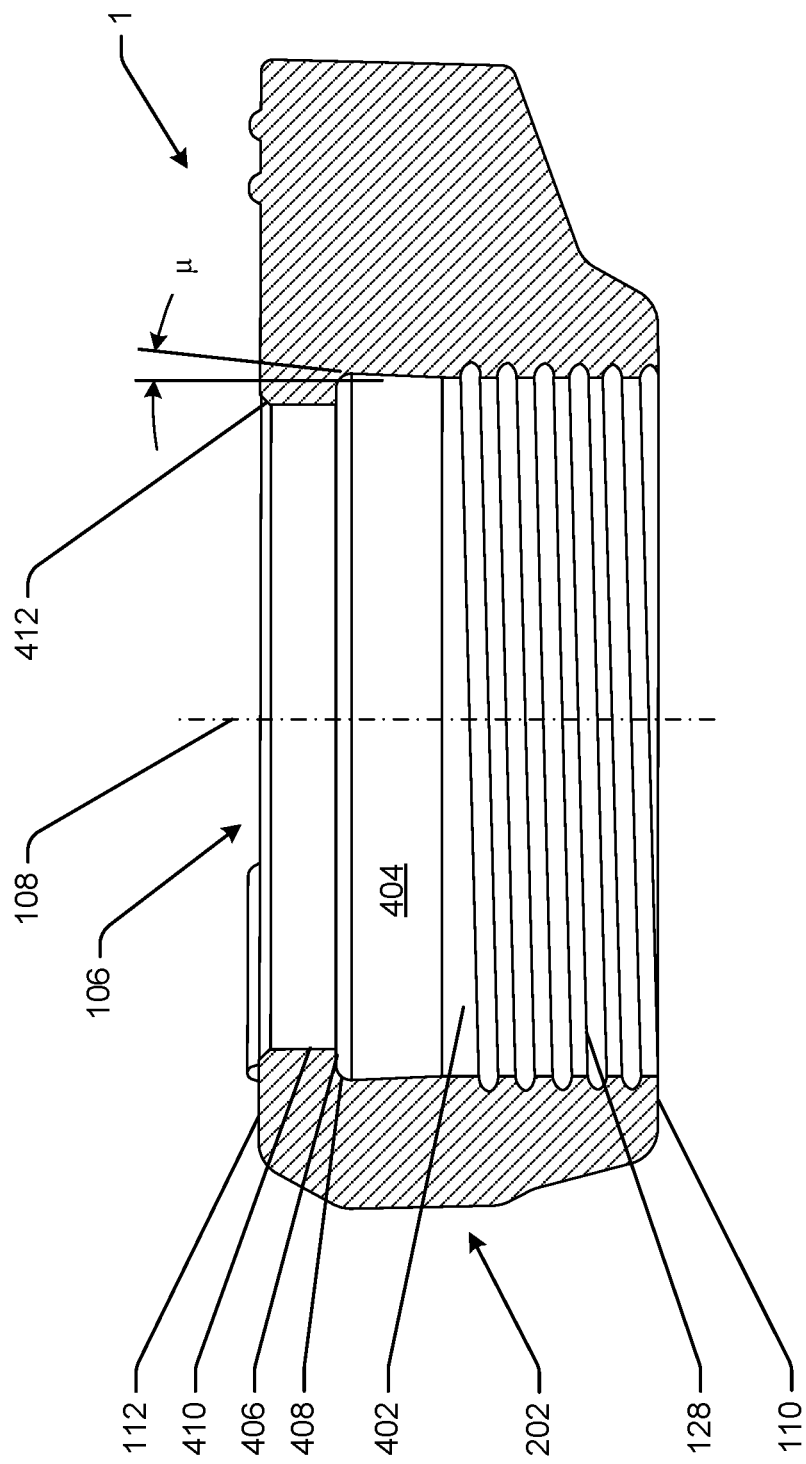
FIG. 4 is a sectional view of the nut of FIG. 1, taken along the section line 4-4 in FIG. 2, in accordance with aspects of this disclosure.

FIG. 4 is a cross-section generally along section line 4-4 in FIG. 2, and shows aspects of the central opening 106 in more detail. Specifically, FIG. 4 shows that the central opening 106 may include a number of varied features and contours, e.g., in addition to the one or more threads 128. More specifically, the one or more threads 128 may extend along a first, substantially cylindrical portion 402 extending generally from the first end 110 toward the second end 112. The one or more threads 128 may comprise a single, continuous thread or a number of discrete, separate, internal threads. The one or more threads 128 may be any threads or threaded arrangements suitable for use in retaining the nut 100 on a threaded pipe, conduit, or the like. By way of non-limiting example, the one or more threads 128 may be sized and/or shaped according to threads specified by a standard-setting organization, and/or configured for use in applications such as the high-pressure applications described herein. In other examples, the one or more threads 128 may conform with a modified thread standard, for example, a J-series screw thread. As illustrated, the one or more threads 128 may extend over substantially all of the cylindrical portion 402, although in other examples, the one or more threads 128 may cover more or less of the cylindrical portion 402 than illustrated. In examples, the one or more threads 128 may be sized to provide a minimum engagement with a mating thread on a pipe or conduit to which the nut 100 is to be secured.

As also illustrated in FIG. 4, the central opening 106 may also include a tapered portion 404. The tapered portion 404 may commence at a termination of the cylindrical portion 402 and extend generally toward the second end 112. As illustrated, the tapered portion 404 results in a widening of the central opening 106, e.g., an increased inner diameter, as the taper portion 404 extends from the termination of the cylindrical portion 402 toward the second end 112. More specifically, the tapered portion 404 may comprise a frustoconical surface having an angle $\mu$ relative to the central axis 108. In some examples, the angle may be between about 2-degrees and about 6-degrees, although the angle may be larger (or smaller) in other implementations. In addition to providing a widening of the central opening 106, the tapered portion 404 also provides a distance, e.g., generally along the central axis 108, that is free from threads. In some implementations, the cylindrical portion 402 can extend a distance along the axis 108 of from about 0.5 to about 2 times that of the tapered portion 404. In examples, an axial length of the cylindrical portion 402 may be based at least in part on the number of turns required for the one or more threads 128 and the axial length of the tapered portion 404 may be based at least in part on the axial length of the cylindrical portion 402 and an overall axial dimension of the nut 100.

The tapered portion 404 terminates at an undercut 406 that is substantially normal to the central axis 108. As illustrated, a junction 408 between the tapered portion 404 and the undercut 406 may be radiused. In examples, the tapered portion 404 promotes a larger radius at the junction 408, compared to a conventional design that does not include the tapered portion 404. As will be appreciated, the greater the angle $\mu$, the larger the radius can be. As also illustrated in FIG. 4, the central opening 106 can also include a bore 410 extending between the undercut 406 and the second end 112. As shown, a junction 412 between the bore 410 and the second end 112 can include an angled chamfer. In other examples, the junction 412 may be radiused or otherwise formed.

In some instances, the central opening 106 can provide improved results relative to conventional designs. For instance, the frustoconical surface of the tapered portion 404 and/or the radiused junction 408 may promote increased wear resistance and reduce failures of the nut 100. In some examples, the tapered portion 404 can provide an unthreaded portion in which a leading edge of a pipe or conduit segment (not shown) onto which the nut 100 will be installed may be disposed when the nut 100 is securely fastened. In some examples, the leading edge of the pipe segment may not contact the undercut 406, as in previous implementations. In other examples the tapered portion 404 may result in limited to no contact of an outer surface (e.g., the threads) of the pipe segment to which the nut 100 is secured, even in instances in which the leading edge of the pipe segment is seated against or otherwise contacts the undercut 406. Stated differently, because the tapered section 404 increases the inner diameter of the central opening 106 between the one or more threads 128 and the undercut 406, relatively little deformation may occur on the surfaces of the central opening 106. Also in examples, the radiused junction 408 may promote reduced stresses from fluid flowing through the central opening 106, including fluid exiting a conduit to which the nut 100 is secured, e.g., relative to a non-radiused junction, which may be conventional.

In still further examples, the nut 100 may be configured to join two pipe segments (not shown). For instance, in some examples, a first pipe segment can include a flange proximate an open end. The flange may be received in the central opening 106, e.g., proximate the tapered portion 404, such that the pipe segment passes through the bore 410. In this example, once the first pipe segment is passed through the bore 410, a second pipe segment, having an external thread, may be received by the one or more threads 128. In this example, an end of the second pipe segment may abut or seat against the flange of the first pipe segment. In still further examples, a collar (not shown) may be disposed contact the undercut 406, as may be conventionally known. In some of these examples, the tapered portion 404 may provide increased clearance for the flange of the first pipe segment, the collar, or other features.

As also illustrated in FIG. 4, the ribs 202 can generally correspond to an area that generally corresponds to the tapered portion 404 and a portion of the cylindrical portion 402 including the termination of the one or more threads 128 and the remained of the cylindrical portion between the one or more threads 128 and the tapered portion 404. As noted above, the ribs 202 may provide an increased thickness at portions of the nut 100 that may be prone to failure. In examples, the termination of the one or more threads 126 and/or the undercut 406 may be particularly susceptible to stress cracks or other manifestations of high pressure, wear, or the like. Although the ribs 202 are illustrated as being located proximate these locations, in other implementations the ribs 202 may be otherwise sized, shaped, or positioned.

INDUSTRIAL APPLICABILITY

The present disclosure provides an improved nut, which may be used in applications such as gas, oil, construction, and fracking applications. The nut may be particularly useful in high pressure applications and/or with fluids containing abrasive particles. The disclosed nut may be in use for extended periods of time before failing and/or requiring replacement, which can result in a decrease in down time for fluid system and/or reduce maintenance time and expense.

According to some embodiments, a nut 100, which may be a hammer nut or a lug nut, may include plurality of spaced lugs 114 that provide an increased surface area for applying rotational forces to secure and/or remove the nut 100. The nut 100 can also include a central opening with a varied profile, including a threaded portion 402, a tapered portion 404, and a reduced-diameter bore 410.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A hammer nut, for connecting two pipe segments that are used to transfer fluids under pressure during oilfield service or production operations, comprising:
   a body having a generally cylindrical shape extending along an axis from a first end to a second end, the body including a sidewall defining an outer surface of the body and a central opening around the axis, the central opening comprising:
   a first cylindrical surface extending a first axial distance from the first end of the body;
   at least one thread formed on the first surface;
   a second surface extending a second axial distance away from the first surface and toward the second end, the second surface being angled, between about 2 degrees and about 6 degrees, relative to the first surface along the second axial distance, wherein the first axial distance is from about 0.5 to about 2.0 times the second axial distance; and
   a third surface proximate the second end, the third surface being disposed radially inwardly of the first surface and the second surface; and
   a plurality of lugs extending radially outwardly from the outer surface of the body.

2. The nut of claim 1, wherein the second surface is angled to create a smaller diameter of the central opening proximate the first end and a larger diameter of the central opening proximate the second end.

3. The nut of claim 2, wherein the central opening further comprises an undercut between the second surface and the third surface.

4. The nut of claim 3, wherein the first surface and the third surface are substantially cylindrical about the axis and the undercut is substantially perpendicular to the axis.

5. The nut of claim 3, wherein a transition between the second surface and the undercut is a radiused surface.

6. The nut of claim 5, wherein a radius of the radiused surface is based on, at least in part, the angle of the second surface relative to the first surface along the second axial distance.

7. The nut of claim 1, wherein the at least one thread is disposed on the first surface so as to be spaced from the second surface by a second distance less than the first distance.

8. The nut of claim 1, wherein a lug of the plurality of lugs includes a generally planar first strike surface and a generally planar second strike surface, the first strike surface and the second strike surface being substantially parallel to the axis and being angled relative to each other.

9. The nut of claim 1, further comprising at least one rib disposed on the outer surface of the body and extending peripherally around the sidewall between a first lug of the plurality of lugs and a second lug of the plurality of lugs.

10. The nut of claim 9, wherein the at least one rib has a substantially uniform outer diameter between the first lug and the second lug.

11. The nut of claim 1, wherein a radius of a transition between the second surface and the third surface is based on, at least in part, the angle of the second surface relative to the first surface along the second axial distance.

12. The nut of claim 1, wherein the angle of the second surface is configured to reduce deformation of one or more surfaces of the central opening.

13. A hammer nut, for connecting two pipe segments that are used to transfer fluids under pressure during oilfield service or production operations, comprising:
a body having a generally cylindrical shape and extending along an axis between a first end and a second end,
the body defining a central opening including a threaded surface proximate the first end and a tapered surface extending between the threaded surface and the second end,
the tapered surface being angled, between about 2 degrees and about 6 degrees, relative to the threaded surface, and
a first radius at a first axial position of the tapered surface relatively closer to the first end being smaller than a second radius at a second axial position of the tapered surface relatively closer to the second end,
wherein the threaded surface extends a first distance along the axis from the first end, the tapered surface extends a second distance along the axis from the termination of the threaded surface, and the first distance is from about 0.5 to about 2.0 times the second distance;
at least one thread formed on the threaded surface; and
a plurality of lugs extending radially outwardly from the outer surface of the body.

14. The nut of claim 13, further comprising at least one rib disposed on the outer surface of the body and extending peripherally around the sidewall between a first lug of the plurality of lugs and a second lug of the plurality of lugs.

15. The nut of claim 13, wherein the first distance is substantially equal to the second distance.

16. The nut of claim 13, wherein the central opening further includes:
a third surface proximate the second end and disposed radially inwardly of the tapered surface; and
an undercut between the tapered surface and the third surface.

17. The nut of claim 16, wherein a transition between the tapered surface and the undercut is a radiused surface.

18. A hammer nut, for connecting two pipe segments that are used to transfer fluids under pressure during oilfield service or production operations, comprising:
a body having a generally cylindrical shape along an axis between a first end and a second end,
the body defining a central opening including a substantially cylindrical threaded portion proximate the first end, a frustoconical portion extending from the threaded portion toward the second end, and a third substantially cylindrical surface proximate the second end,
the frustoconical portion being angled, between about 2 degrees and about 6 degrees, relative to the threaded portion, and
a radius of the frustoconical portion being relatively smaller proximate the threaded portion and relatively larger away from the threaded portion and the third substantially cylindrical portion having a radius less than a radius of the threaded portion,
wherein threaded portion extends a first distance along the axis from the first end, the frustoconical portion extends a second distance along the axis between the threaded portion and the third substantially cylindrical surface, and the first distance is between about 0.5 and about 2.0 times the second distance;
at least one thread formed on the threaded surface; and
a plurality of lugs extending outwardly from the outer surface of the body.

19. The nut of claim 18, wherein the central opening further includes:
an undercut between the frustoconical portion and the third substantially cylindrical portion.

20. The nut of claim 19, wherein a transition between the frustoconical portion and the undercut is a radiused surface.

* * * * *